Patented Apr. 13, 1926.

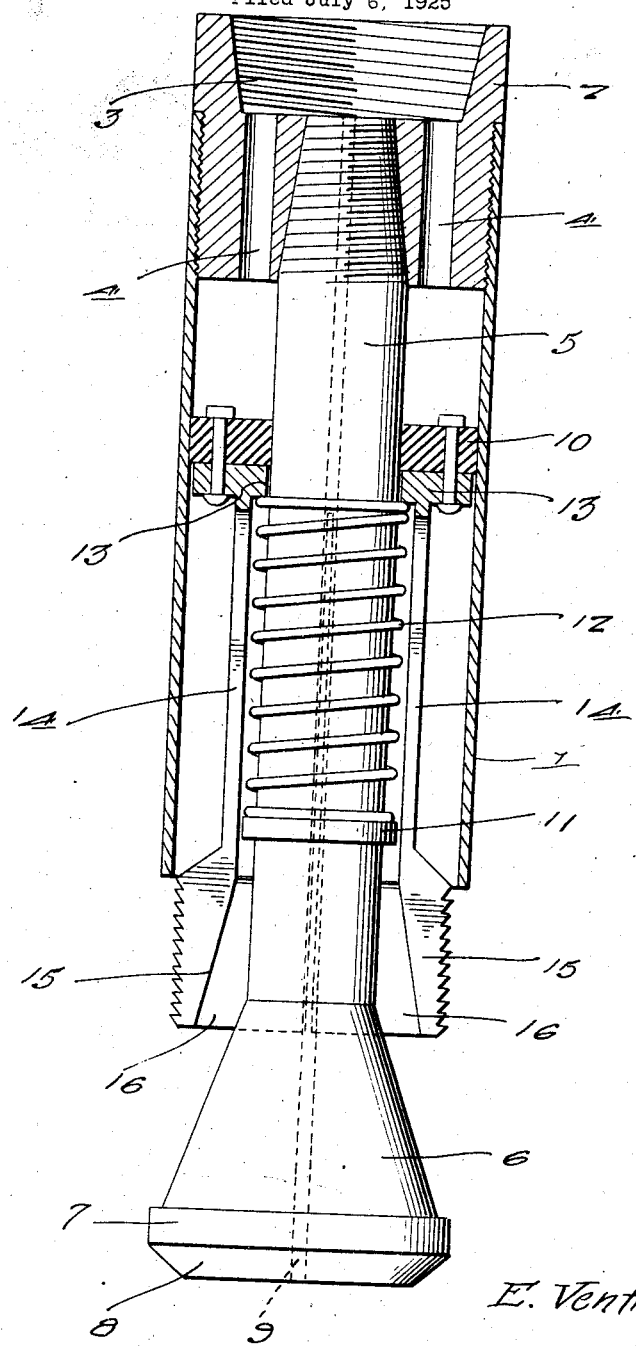

1,580,352

UNITED STATES PATENT OFFICE.

ERCOLE VENTRESCA, OF HOUSTON, TEXAS.

WELL-FISHING TOOL.

Application filed July 6, 1925. Serial No. 41,649.

*To all whom it may concern:*

Be it known that I, ERCOLE VENTRESCA, a citizen of the United States, residing at Houston, in the county of Harris and State of Texas, have invented certain new and useful Improvements in a Well-Fishing Tool, of which the following is a specification.

This invention relates to what is commonly known as a well fishing tool, that is, a device employed for recovering lost tools from a well.

The principal object is to generally improve upon devices of this class by providing one of comparative simplicity and durability wherein the details are arranged in a manner to provide a practical structure capable of effectively accomplishing the results sought, and at the same time producing one which is inexpensive and easy to manipulate.

Broadly, the invention comprises a cylinder in which a piston is slidable, the piston being equipped with expansible grips, and there being a spreader in association with the cylinder and with which these grips cooperate to spread them into engagement with lengths of pipe and the like.

Other features and advantages of the invention will become apparent from the following description and drawing.

In the accompanying drawing forming a part of this application and in which like numerals are employed to designate like parts throughout the same:

The figure represents a central vertical section through the device showing certain of the parts in elevation to distinguish and render the showing complete.

Referring to the drawing in detail the reference character 1 designates an open ended tube, which will hereinafter be designated as a cylinder. This is internally screw-threaded at its upper end and a plug 2 is tapped into it. This plug is counter bored and screw threaded to provide a screw threaded socket 3. Further, it is provided with appropriate passages 4 for water. Then, at the center it is provided with a tapered screw threaded hole for reception of a correspondingly shaped end of a stem 5 of cylindrical form. This stem is of a diameter considerably smaller than that of the cylinder, and its lower end extends beyond the corresponding end of the cylinder, and is provided with a tapered head 6 functioning as a spreader. This may be designated as a conical spreader. At its free end or base, it is provided with a surrounding annular shoulder 7, and an inwardly tapered end 8 to facilitate insertion in a pipe or the like at the bottom of a well. If desired, a central bore forming a passage 9 may be provided for passage of water, thus permitting the lodged object to be loosened somewhat.

Slidable in the cylinder is a piston including a head 10 fitting snugly but slidably, and surrounding the stem 5. In this connection it will be noticed that a shoulder 11 is provided on the stem and that a coiled spring 12 surrounds the stem, bears at one end against the shoulder and at its opposite end against the piston head. Most specifically, this spring bears against metal segments 13 which are bolted to the underside of the piston head and which serve to carry depending resilient arms 14 having toothed or threaded pipe gripping sectors 15 at their lower ends. It will be noted that the inner surfaces of the sectors are conical as at 16 for cooperation with the correspondingly shaped surface of the conical spreader 6.

Normally, the gripping members 16 are spaced from the conical spreader as shown in the drawing, thus not interfering with the insertion of the tool down into the well.

As the tool is inserted, water under pressure is supplied to the cylinder through the passages 4. The water forces the piston downwardly and brings the gripping member 16 into contact with the conical portion 6. Thus these members will be spread out and into engagement with the inner surface of a pipe into which the tool has been inserted. After an effective grip is attained, the tool is lifted up, and the pipe may be withdrawn from the well. Upon releasing the water pressure, and bringing the tool to the surface and disconnecting it from the water supply pipe, the spring 12 returns the piston to its normal state and releases the pipe.

Attention is called to the fact that the screw threads of the counter bore 3 are opposite to the screw threads of the tapered threaded end of the stem 5. The purpose of this arrangement is to allow the stem to be separated from the remainder of the tool to allow the stem to drop down into the hole. In many instances the object to be withdrawn is too obstinate or too heavy after a grip has been obtained, difficulty is sometimes experienced in getting the tool out of the hole. By releasing the stem 5 however, the tool may be readily withdrawn without undue breakage of parts. The opposite disposition of the screw threads of the stem and the remainder of the tool will permit the latter to be turned with respect to the stem to release the same and to allow it to fall down into the hole.

No doubt, a consideration of the description in connection with the drawing will enable persons skilled in the art to which the invention relates to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. A well fishing tool comprising an open ended cylinder, a plug fitted into one end of the cylinder, said plug being provided with a socket for connection of a fluid supply pipe and with bores forming passages for the fluid, a stem connected centrally with said plug and extending through and beyond said cylinder, a conical spreader on the extended end of the stem, a piston slidable in the cylinder and surrounding said stem, resilient arms connected to said piston and depending through said cylinder, gripping members on the lower ends of said arms, said gripping members being cooperable with and expanded by said spreader, and spring means for holding the piston in a predetermined position.

2. A well fishing tool comprising a cylinder, a stationary stem arranged centrally in said cylinder and extending through and beyond one end of the same, a conical spreader on the extended end of the stem, a piston slidable in the cylinder and surrounding said stem, resilient arms connected to said piston and depending through said cylinder, gripping members on the lower end of said arms, said members being cooperable with and expanded by said spreader, and spring means for holding the piston in a predetermined position.

In testimony whereof I affix my signature.

ERCOLE VENTRESCA.